US005484666A

United States Patent [19]
Gibb et al.

[11] Patent Number: 5,484,666
[45] Date of Patent: Jan. 16, 1996

[54] ELECTROCHEMICAL FUEL CELL STACK WITH COMPRESSION MECHANISM EXTENDING THROUGH INTERIOR MANIFOLD HEADERS

[75] Inventors: Peter Gibb, Coquitlam; Henry H. Voss, West Vancouver; Wolfgang Schlosser, Burnaby; Eric G. Pow, Vancouver, all of Canada

[73] Assignee: Ballard Power Systems Inc., North Vancouver, Canada

[21] Appl. No.: 309,124

[22] Filed: Sep. 20, 1994

[51] Int. Cl.⁶ .................................................. H01M 8/04
[52] U.S. Cl. ................................................ 429/34; 429/39
[58] Field of Search ............................... 429/34, 38, 39, 429/37, 12, 32

[56] References Cited

U.S. PATENT DOCUMENTS

| | | |
|---|---|---|
| 3,278,336 | 10/1966 | Uline et al. . |
| 3,615,838 | 10/1971 | Erickson . |
| 3,814,631 | 6/1974 | Warszawski et al. . |
| 4,346,150 | 8/1982 | Bellows et al. . |
| 4,403,018 | 9/1983 | Alfenaar et al. . |
| 4,743,518 | 5/1988 | Romanowski . |
| 4,943,495 | 7/1990 | Okada et al. . |
| 5,252,410 | 10/1993 | Wilkinson et al. ................ 429/33 |
| 5,300,370 | 4/1994 | Washington et al. ............... 429/34 |
| 5,326,650 | 7/1994 | Ishida ............................ 429/34 X |
| 5,342,706 | 8/1994 | Marianowski et al. . |

*Primary Examiner*—Anthony Skapars
*Attorney, Agent, or Firm*—McAndrews, Held & Malloy, Ltd.

[57] ABSTRACT

An electrochemical fuel cell stack has a first end plate, a second end plate, and fuel cell assemblies interposed therebetween. Each fuel cell assembly includes a membrane electrode assembly having at least one manifold header opening formed in the assembly for directing at least one of a fluid fuel stream, a fluid oxidant stream and a fluid coolant stream through the assembly. A tie rod extends within the opening and through each of the first and second end plates. Fastening means are disposed at opposite ends of the tie rod. Compressive means are interposed between at least one of the fastening means and at least one of the first and second end plates. In operation, the fastening means and the compressive means urge the first end plate toward the second end plate, thereby applying compressive force to the fuel cell assemblies.

27 Claims, 6 Drawing Sheets

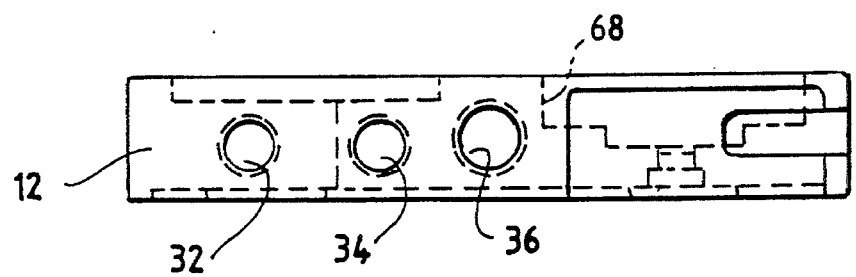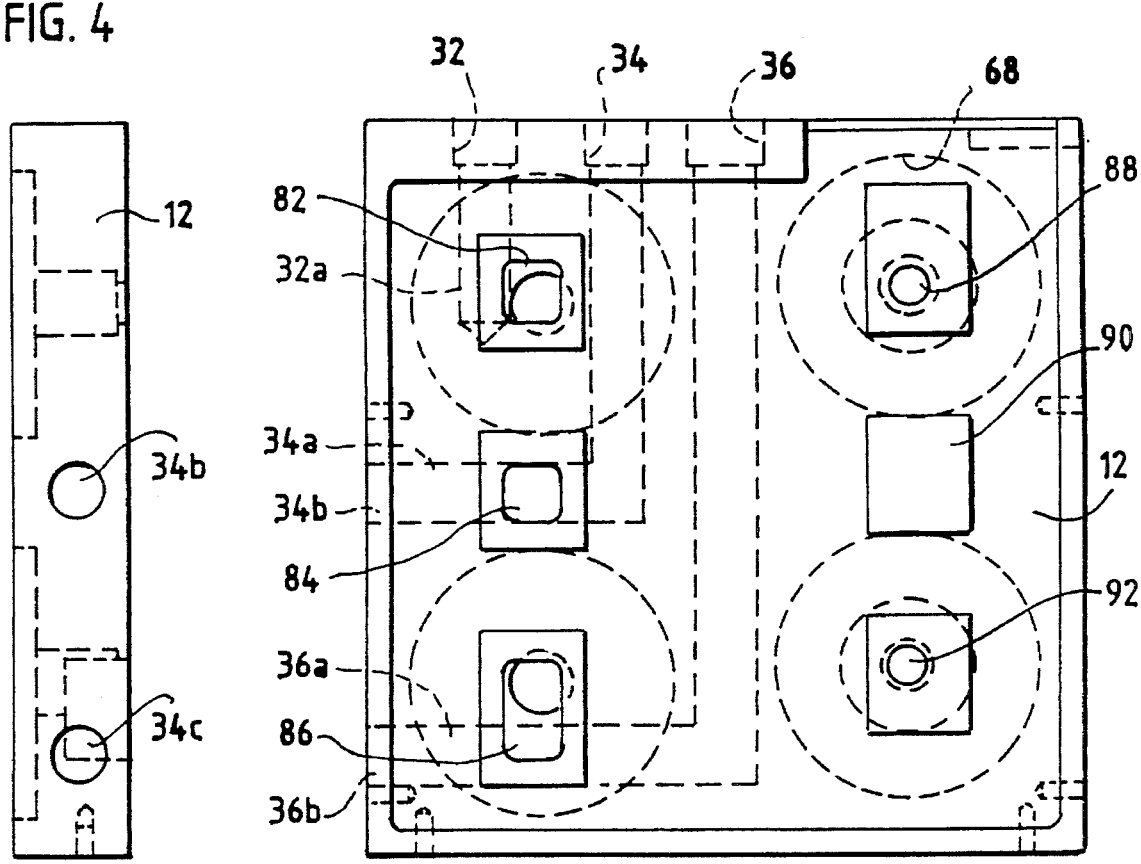

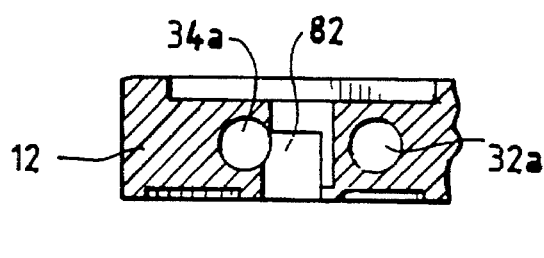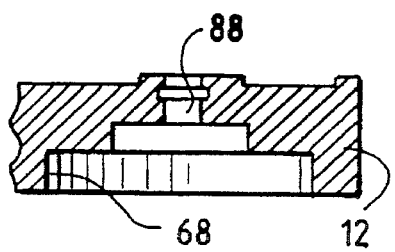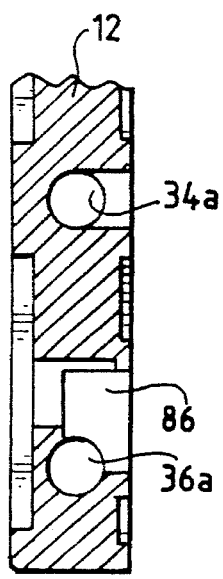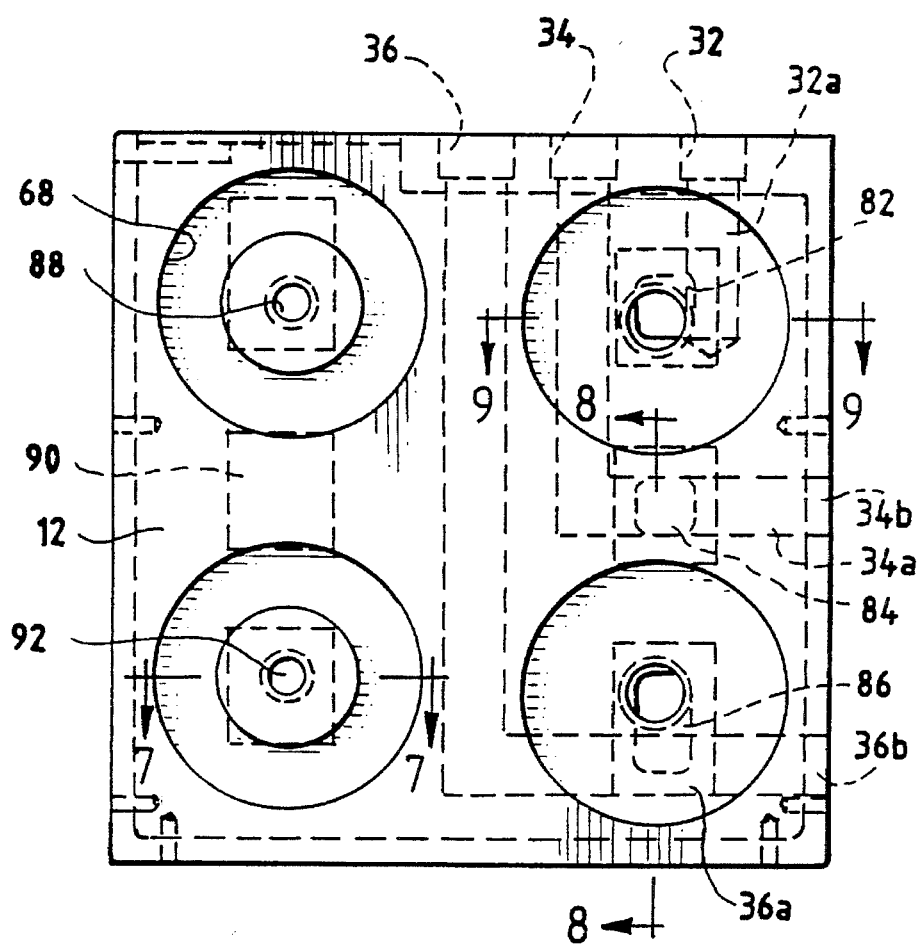

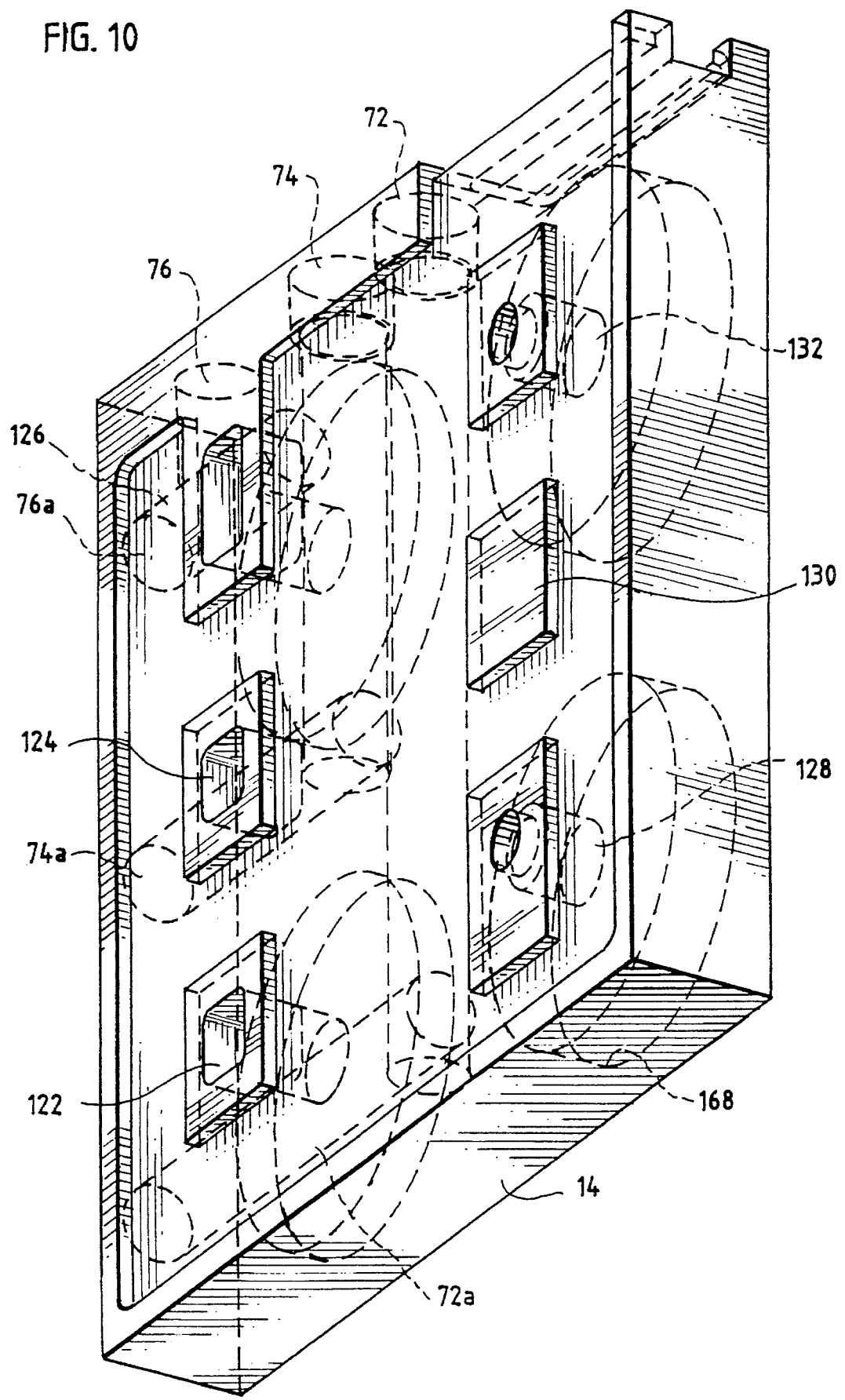

ELECTROCHEMICAL FUEL CELL STACK WITH COMPRESSION MECHANISM EXTENDING THROUGH INTERIOR MANIFOLD HEADERS

FIELD OF THE INVENTION

The present invention relates to electrochemical fuel cells. More particularly, the present invention relates to an electrochemical fuel cell stack in which the mechanism for securing the stack in its compressed, assembled state includes a compression mechanism that extends through interior, centrally disposed manifold headers.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

Anode reaction: 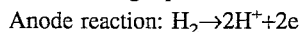$H_2 \rightarrow 2H^+ + 2e$

Cathode reaction: 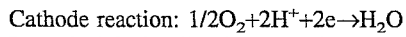$1/2 O_2 + 2H^+ + 2e \rightarrow H_2O$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The fluid flow field plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given fluid flow field plate serves as an anode plate for one cell and the other side of the fluid flow field plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack.

In conventional fuel cell designs, such as, for example, the fuel cells described and illustrated in U.S. Pat. Nos. 3,134,697, 3,297,484, 3,297,490, 4,057,479, 4214,969 and 4,478,917, the end plates which make up each conventional fuel cell assembly are compressed and maintained in their assembled states by tie rods. The tie rods extend through holes formed in the peripheral edge portion of the end plates and have nuts or other fastening means assembling the tie rods to the fuel cell assembly and compressing the end plates of the fuel cell assembly toward each other. The reason for employing a peripheral location for the tie rods in conventional designs is to avoid the introduction of openings or otherwise interfering with the central, electrochemically active portion of the fuel cell.

In some conventional fuel cell stack assemblies, such as, for example, that described and illustrated in U.S. Pat. No. 5,176,966 (see FIG. 1), a hydraulic piston or bladder is installed adjacent one of the end plates. In such conventional arrangements, the hydraulic piston uniformly applies compressive force to the stack, permits control of the compressive force applied to the end plate, and allows for the expansion and contraction of the tie rods as they are heated and cooled during operation of the fuel cells.

In fuel cell stack assemblies in which hydraulic pistons are not employed, the use of springs in conjunction with tie rods is generally required to compress the stack and to maintain the compressive load over time. In general, the length of a fuel cell stack shortens over time due to the tendency of MEAs to gradually decrease in thickness while under compressive load. Optimally, the springs should impart a predetermined compressive load with minimal load variation over as large a deflection range as possible. When peripherally disposed tie rods are employed, each of the end plates securing the fluid flow field plates and MEAs must be greater in area (and therefore overhang) the fluid flow field plates and MEAs. The amount of overhang depends upon the diameter of the springs inserted at the ends of the tie rods between the end plates and the nuts securing the tie rods, since substantially all of the springs' diameter should be in contact with the end plate to provide effective and uniform compressive load.

In fuel cell stack applications, disc springs (sometimes referred to as Belleville washers) have been found to provide desirably high compressive load in a compact space. Additionally, disc springs are advantageous, particularly in comparison to other types of springs, in that, by selecting the proper thickness-to-diameter ratio, disc springs exhibit a flat load versus deflection curve at the upper half of their deflection range. This characteristic is most notably exhibited by disc springs having lower thicknesses. Thinner disc springs not only produce desirable load characteristics, but the overall height of a stack of disc springs is reduced, resulting in improved volumetric efficiency of the compression mechanism. However, for a given disc spring diameter, the compressive load produced by the spring decreases with decreasing material thickness. Therefore, in order to produce the same compressive load in a smaller volume, either the number of disc spring locations must be increased or the diameter of the springs must be increased.

The peripheral edge location of the tie rods in conventional fuel cell designs has inherent disadvantages. First, the peripheral location of the tie rods requires that the thickness of the end plates be substantial to provide the stiffness necessary to transmit the compressive force uniformly across the entire area of the end plate. End plates having insufficient thickness will deflect and will not adequately compress the central region of the various interior humidification and active section MEAs and fluid flow field plates interposed between the end plates. Inadequate compressive forces can compromise the seals associated with the manifold headers and flow fields in the central regions of the interior fluid flow field plates, and also compromise the electrical contact required along the surfaces of the fluid flow field plates to provide the serial electrical connection among the fuel cells which make up the stack. However, end plates of substantial thickness contribute significantly to the overall weight and volume of the fuel cell stack, both of which are preferable to minimize, particularly in motive fuel cell applications.

Additionally, the peripheral location of the tie rods requires that the area of the end plates be substantially greater than the area of the fluid flow field plates and MEAs in order to accommodate the springs interposed between the end plates and the nuts securing the tie rods. The increased area of the end plates to accommodate the springs increases the overall volume occupied by the fuel cell stack, thereby reducing its volumetric efficiency.

The peripheral edge location of fluid manifolds in conventional fuel cell stack designs is also disadvantageous. In order to provide sufficient structural strength to contain the elevated pressures within the manifolds, a significant thickness of constraining material must be provided between the interior of the manifolds and the outer edge of the flow field plate. This constraining material does not contribute to electrochemical activity, but does add to stack volume and weight.

SUMMARY OF THE INVENTION

In one embodiment, the present invention is an electrochemical fuel cell stack for producing electrical energy and reaction product from a fluid fuel stream and a fluid oxidant stream. The stack comprises:

(a) a first end plate;

(b) a second end plate;

(c) at least one fuel cell assembly interposed between the first and second end plates, the at least one fuel cell assembly comprising a membrane electrode assembly having a catalytically active region and further having at least one opening formed therein extending through the catalytically active region;

(d) a compression assembly comprising at least one restraining member extending within the at least one opening, fastening means disposed at opposite ends of the at least one restraining member, and compressive means interposed between at least one of the fastening means and at least one of the first and second end plates.

In operation, the fastening means and the compressive means urge the first end plate toward the second end plate, thereby applying compressive force to the at least one fuel cell assembly.

The compressive means can be formed integrally with the restraining member such as, for example, a tie rod having a spring portion or a tie rod formed of resilient material.

In the preferred fuel cell stack, the at least one opening directs at least of one of the fluid fuel stream and the fluid oxidant stream through the at least one fuel cell assembly. The at least one opening is preferably substantially surrounded by the catalytically active region. The at least one fuel cell assembly preferably further comprises a pair of fluid flow field plates, the fluid flow field plates being disposed on opposite sides of the membrane electrode assembly and having at least one opening formed therein corresponding with the at least one opening formed in the at least one membrane electrode assembly, and the at least one restraining member extending through the at least one opening formed in the membrane electrode assembly and through the at least one opening formed in the fluid flow field plates.

In the preferred fuel cell stack, at least one of the first end plate and the second end plate has a cavity formed on the side facing away from membrane electrode assembly, and the compressive means is mounted within the cavity. The compressive means preferably comprises at least one disc spring. The compressive means most preferably comprises a plurality of stacked disc springs. The compressive means can also comprise a coiled spring.

In the preferred fuel cell stack, the at least one restraining member is threaded at each of its opposite ends, and the fastening means preferably comprise correspondingly threaded nuts.

When each of the first and second end plates is square, the at least one membrane electrode assembly preferably has at least four openings formed therein, and the at least one restraining member comprises four restraining members extending through the openings, each of the restraining members extending through the first and second end plates substantially at the center of the quadrants thereof. The at least one restraining member can also be a single restraining member extending through the first and second end plates substantially at the center thereof.

In a fuel cell stack further comprising a fluid coolant stream, the at least one restraining member can extend within the opening for directing the fluid coolant stream through the stack.

In another embodiment, the present invention is an electrochemical fuel cell stack for producing electrical energy and reaction product from a fluid fuel stream and a fluid oxidant stream. The stack comprises a fuel stream inlet, an oxidant stream inlet, and at least one fuel cell assembly comprising a membrane electrode assembly having a catalytically active region. The at least one fuel cell assembly has openings formed therein extending through the catalytically active region. The openings comprise an inlet fuel stream header opening and an inlet oxidant stream header opening. The inlet fuel stream header opening is in direct, unbranched fluid communication with the fuel stream inlet and the inlet oxidant stream header opening is in direct, unbranched fluid communication with the oxidant stream inlet. This embodiment circumvents the requirement in conventional designs for pressure restraining material around the headers, which does not contribute to electrochemical activity, but does add to the required volume and weight. This embodiment thus increases both volumetric and gravimetric power density of the fuel cell stack.

In a preferred version of the above embodiment, the stack further comprises a fuel stream outlet and an oxidant stream outlet, and the openings further comprise an outlet fuel stream header opening and an outlet oxidant stream header opening. The outlet fuel stream header opening is most preferably in direct, unbranched fluid communication with the fuel stream outlet and the outlet oxidant stream header opening is most preferably in direct, unbranched fluid communication with the oxidant stream outlet.

BRIEF DESCRIPTION OF THE DRAWINGS

FIG. 3 is an end elevation view of the inlet end plate illustrated in FIG. 2.

FIG. 4 is a side elevation view of the inlet end plate illustrated in FIG. 2.

FIG. 5 is a top view of the inlet end plate illustrated in FIG. 2.

FIG. 6 is an end elevation view of the other side of the inlet end plate from that illustrated in FIG. 3.

FIG. 7 is a side sectional view taken in the direction of arrows 7—7 in FIG. 6.

FIG. 8 is an end sectional view taken in the direction of arrows 8—8 in FIGS. 6.

FIG. 9 is an end sectional view taken in the direction of arrows 9—9 in FIG. 6.

FIG. 10 is a perspective view of the outlet end plate of the electrochemical fuel cell stack illustrated in FIG. 1.

DETAILED DESCRIPTION OF THE PREFERRED EMBODIMENTS

Figure 1:
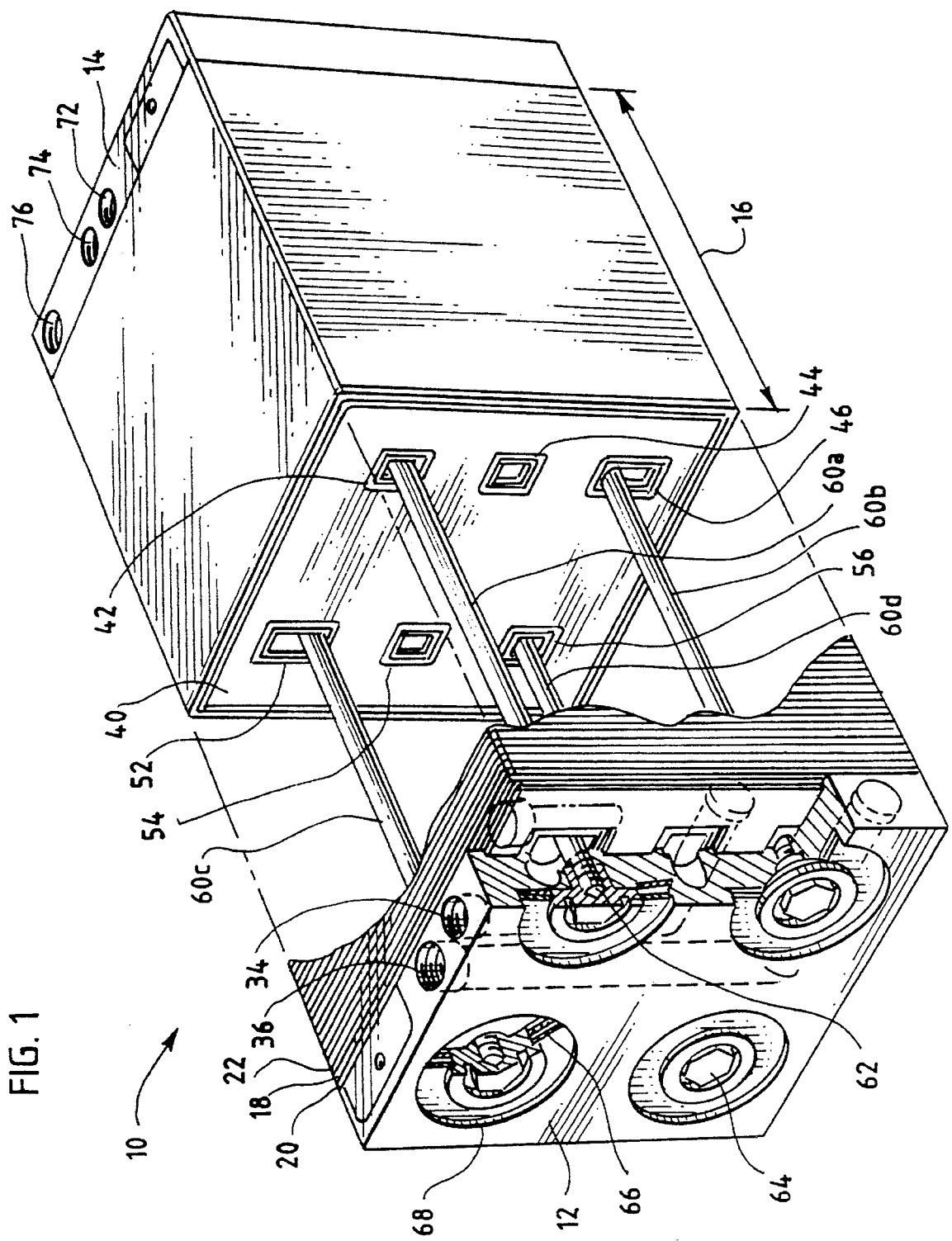
FIG. 1 is a perspective view of a preferred embodiment of an electrochemical fuel cell stack with a compression mechanism which extends through interior, centrally disposed manifold headers.

Turning first to FIG. 1, an electrochemical fuel cell stack 10 includes a plurality of fuel cell assemblies, a series of which are designated as fuel cell assemblies 16 in FIG. 1. Each of the fuel cell assemblies includes a membrane electrode assembly 18 interposed between a pair of fluid flow field plates 20, 22. Fuel cell stack 10 also includes a first end plate 12, which is an inlet end plate in FIG. 1, and a second end plate 14, which is an outlet end plate in FIG. 1.

Inlet end plate 12 has inlet manifolds formed therein for introducing the reactant and coolant streams to stack 10. Fuel inlet manifold 32 introduces the fluid fuel stream (typically a hydrogen-containing gas stream) to stack 10. Oxidant inlet manifold 36 introduces the fluid oxidant stream (typically an oxygen-containing air stream) to stack 10. Coolant inlet manifold 34 introduces the fluid coolant stream (typically water) to stack 10.

A typical membrane electrode assembly 40 is shown in FIG. 1 to have a plurality of openings formed therein, which cooperate with corresponding openings in adjacent layers to direct the reactant and coolant streams through stack 10. Opening 42 corresponds to the fuel inlet header for directing and introducing the unreacted fuel stream to each of the MEAs in stack 10. Opening 44 corresponds to the coolant inlet header for directing and introducing the fluid coolant stream to each of the coolant plate assemblies (not shown) in stack 10. Opening 46 corresponds to the oxidant inlet header for directing and introducing the unreacted oxidant stream to each of the MEAs in stack 10.

Similarly, opening 52 corresponds to the oxidant outlet header for collecting, directing and exhausting the reacted oxidant stream from each of the MEAs in stack 10. Opening 54 corresponds to the coolant outlet header for collecting, directing and exhausting the coolant fluid stream from each of the coolant plate assemblies in stack 10. Opening 56 corresponds to the fuel outlet header for collecting, directing and exhausting the reacted fuel stream from each of the MEAs in stack 10.

The inlet fuel, coolant and oxidant streams are introduced to stack 10 via inlet manifold openings 32, 34, 36, respectively. The outlet fuel, coolant and oxidant streams are exhausted from stack 10 via outlet manifold openings 72, 74, 76, respectively.

Restraining members, shown in FIG. 1 as tie rods 60a, 60b, 60c, 60d, extend through headers 42, 46, 52, 56, respectively, as well as through openings in inlet end plate 12 and in outlet end plate 14. The tie rods are threaded at each of their opposite ends, as shown, for example, by threaded portion 62 of tie rod 60a. The tie rods have fastening means, one of which is shown in FIG. 1 as threaded nut 64, disposed at opposite ends of each of the tie rods 60a, 60b, 60c, 60d.

Compressive means, one of which is shown, for example, in FIG. 1 as a stack of disc springs 66, are interposed between the fastening means (threaded nut 64) and inlet end plate 12. Inlet end plate 12 has a cavity 68 formed on the side facing away from membrane electrode assemblies 16 for mounting the compressive means (stack of disc springs 66) within cavity 68, as shown in FIG. 1. Outlet end plate 14 has an identical arrangement of disc springs mounted within cavities (not shown in FIG. 1) and interposed between outlet end plate 14 and the fasteners attached to the ends of tie rods 60a, 60b, 60c, 60d extending through outlet end plate 14.

In operation, the threaded nuts 64 urge the disc springs 66 against inlet end plate 12, and corresponding threaded nuts urge disc springs against outlet end plate 14, so as to urge inlet end plate 12 toward outlet end plate 14, thereby applying compressive force to the fuel cell assemblies.

Figure 2:
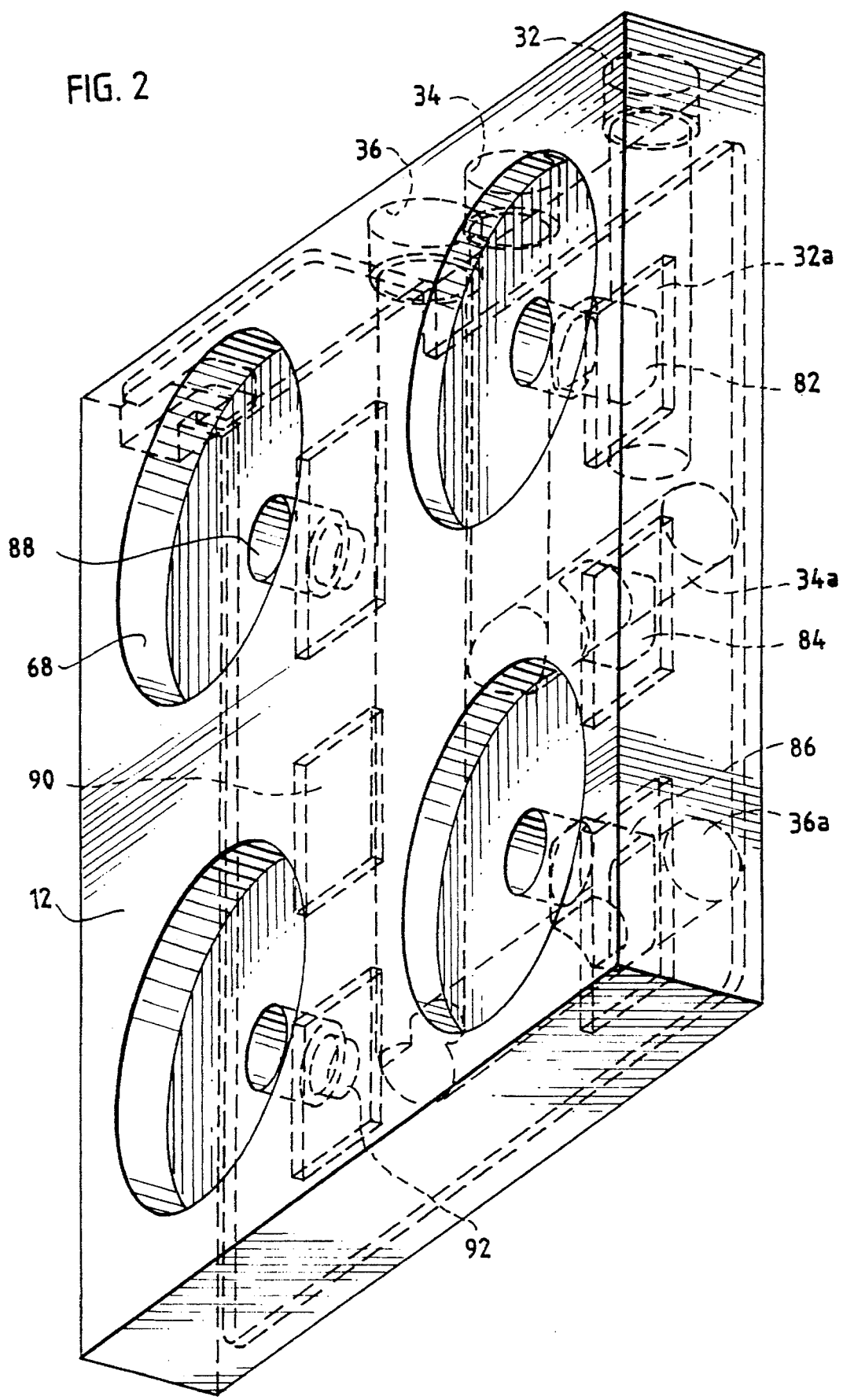
FIG. 2 is a perspective view of the inlet end plate of the electrochemical fuel cell stack illustrated in FIG. 1.

Turning now to FIG. 2, inlet end plate 12 is shown in perspective view as including fuel inlet manifold 32 and associated manifold branch 32a, oxidant inlet manifold 36 and associated manifold branch 36a, and coolant inlet manifold 34 and associated manifold branch 34a. Manifold branches 32a, 34a, 36a are fluidly connected to manifold header openings 82, 84, 86, which are aligned and fluidly communicate with inlet headers 42, 44, 46 (not shown in FIG. 2), respectively, in the fuel cell assemblies (see FIG. 1). As shown in FIG. 2, inlet end plate 12 further has an opening 88, which is aligned with and accommodates the end of tie rod extending from oxidant outlet header 52 (see FIG. 1). A solid portion 90 seals coolant outlet header 54 (see FIG. 1) against inlet end plate 12. Inlet end plate 12 also has an opening 92, which is aligned with and accommodates the end of tie rod extending from fuel outlet header 56 (see FIG. 1). As shown in FIG. 2, inlet end plate 12 has a recessed portion or cavity 68 for mounting the stack of disc springs (see disc springs 66 in FIG. 1) which provide the compressive force to the stack.

FIGS. 3–9 show further detailed views of inlet end plate 12. In addition to the components illustrated in FIGS. 1 and 2 and described above, FIGS. 3, 4, 6 and 8 show that coolant manifold branch 34a and oxidant manifold branch 36a terminate at removable end caps 34b, 36b, respectively.

In FIG. 10, outlet end plate 14 is shown in perspective view as including fuel outlet manifold 72 and associated manifold branch 72a, oxidant outlet manifold 76 and associated manifold branch 76a, and coolant outlet manifold 74 and associated manifold branch 74a. Manifold branches 72a, 74a, 76a are fluidly connected to manifold header openings 122, 124, 126, which are aligned and fluidly communicate with inlet headers 52, 54, 56 (not shown in FIG. 10), respectively, in the fuel cell assemblies (see FIG. 1). As shown in FIG. 10, outlet end plate 14 further has an opening 128, which is aligned with and accommodates the end of tie rod extending from oxidant inlet header 46 (see FIG. 1). A solid portion 130 seals coolant inlet header 44 (see FIG. 1) against outlet end plate 14. Outlet end plate 14 also has an opening 132, which is aligned with and accommodates the end of tie rod extending from fuel inlet header 42 (see FIG. 1). As shown in FIG. 10, outlet end plate 14 has a recessed portion or cavity 168 for mounting the stack of disc springs (see disc springs 66 in FIG. 1) which provide the compressive force to the stack.

Figure 11:
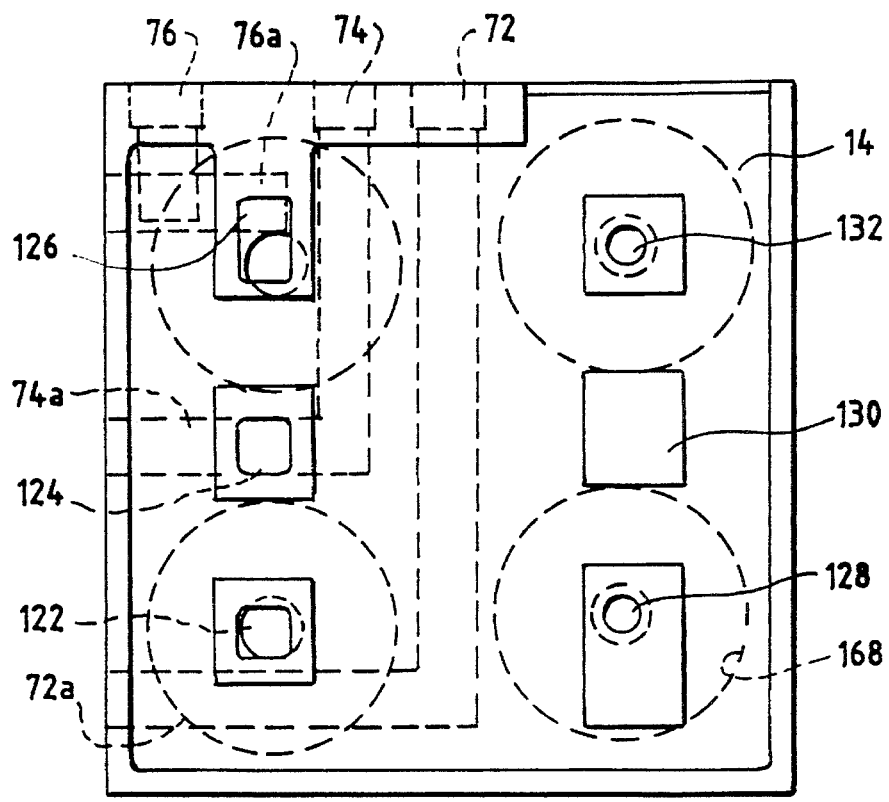
FIG. 11 is an end elevation view of the outlet end plate illustrated in FIG. 10.
Figure 12:
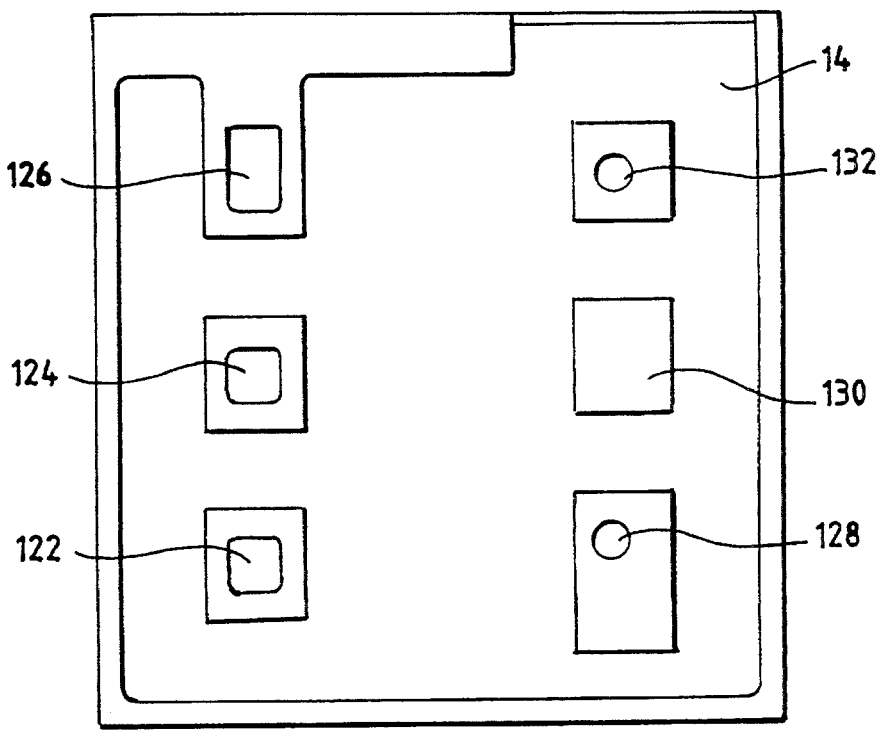
FIG. 12 is an end elevation view of the interior-facing surface of the outlet end plate illustrated in FIG. 10.

In FIG. 11, an elevation view of outlet end plate 14 shows the same components illustrated in FIG. 10 and described above. FIG. 12 shows an end elevation view of the interior-facing surface of outlet end plate 14. The surface illustrated in FIG. 12 is located adjacent the fuel cell assemblies when the stack is assembled (see FIG. 1).

Locating the tie rods so that they extend through the central, interior portion of the end plates allows larger diameter disc springs to be employed in comparison to conventional fuel cell stack designs employing peripherally disposed tie rods. When peripherally disposed tie rods are employed, large diameter disc springs would undesirably overhang the adjacent end plate. With centrally disposed tie rods, larger diameter and thinner disc springs can be employed and still produce the required compressive force and load profile. Moreover, the stresses on end plates in fuel cell stacks employing centrally disposed tie rods are significantly less than the stresses on end plates in fuel cell stacks with tie rods located at the periphery of the stack. Thus, the use of centrally disposed tie rods permits the employment of thinner end plates by more uniformly distributing the compressive force and by reducing the span across which that force is applied.

The use of centrally disposed tie rods in conjunction with disc springs at the end plates also permits elimination of the hydraulic piston traditionally employed adjacent one of the end plates in conventional fuel cell stack designs. In this regard, the hydraulic piston uniformly applied compressive force to the stack, permitted control of the application of compressive force to the adjacent end plate, and allowed for expansion and contraction of the tie rods as they were heated and cooled during operation of the fuel cells. The disc springs of the present invention perform, among other things, the functions of the piston.

The factors influencing the number and location of the tie rods and disc springs are the shape and thickness of the MEAs and fluid flow field plates which make up the fuel cell assemblies, the number and location of the headers, and the shape and thickness of the end plates. In some cases, particularly with round plates, a single, centrally disposed tie rod arrangement with an extremely large diameter disc spring may be the optimal compression mechanism. In the case of rectangular end plates, the minimum number of tie rods is probably two to provide a uniform distribution across the end plate. In the case of square end plates, the use of four tie rods has been found to be effective. Locating the tie rods at approximately the center of each of the four quadrants, with the outside diameter of the adjacent disc spring contacting the end plate, has been found to distribute a suitable and uniform compressive load across the end plate.

Extending the tie rods through interior manifold headers also has sealing advantages. In this regard, if the tie rods were extended through the fluid flow field plates and membrane electrode assemblies at locations other than the manifold headers, then seals would be required around the penetrations. Since the seals would have to extend around the penetrations, the seals also occupy a significant amount of area that could otherwise be used to support the electrochemical reaction. Extending the tie rods through interior manifold headers eliminates the need for the extra seal around the tie rod.

It has also been found advantageous to form the header openings in the fluid flow field plates and membrane electrode assemblies such that the tie rods extend from the headers toward the centers of the quadrants of the end plates. This configuration has been found to result in a minimal disc spring height, a disc spring diameter suited to the required load, and a substantially constant load profile over the working deflection range of the spring.

It has also been found advantageous to form the header openings in the fluid flow field plates and MEAs such that the openings are surrounded by electrochemically active materials. This configuration enables structural pressure containment within the openings with no additional non-active materials, thus reducing the size and weight of the stack. This configuration results in a fuel cell stack having openings formed therein extending through the electrochemically active region. The openings comprise an inlet fuel stream header opening and an inlet oxidant stream header opening. The inlet fuel stream header opening is in direct, unbranched fluid communication with the fuel stream inlet and the inlet oxidant stream header opening is in direct, unbranched fluid communication with the oxidant stream inlet.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack for producing electrical energy and reaction product from a fluid fuel stream and a fluid oxidant stream, said stack comprising:

(a) a first end plate;

(b) a second end plate;

(c) at least one fuel cell assembly interposed between said first and second end plates, said at least one fuel cell assembly comprising a membrane electrode assembly having a catalytically active region and further having at least one opening formed therein extending through said catalytically active region;

(d) a compression assembly comprising at least one restraining member extending within said at least one opening, fastening means disposed at opposite ends of said at least one restraining member, and compressive means interposed between at least one of said fastening means and at least one of said first and second end plates;

whereby said fastening means and said compressive means urge said first end plate toward said second end plate, thereby applying compressive force to said at least one fuel cell assembly.

2. The electrochemical fuel cell stack of claim 1 wherein said compressive means is integral with said restraining member.

3. The electrochemical fuel cell stack of claim 1 wherein said at least one opening directs at least of one of said fluid fuel and oxidant streams through said at least one fuel cell assembly.

4. The electrochemical fuel cell stack of claim 1 wherein said at least one opening is substantially surrounded by said catalytically active region.

5. The electrochemical fuel cell stack of claim 1 wherein said at least one fuel cell assembly further comprises a pair of fluid flow field plates, said fluid flow field plates being disposed on opposite sides of said membrane electrode assembly and having at least one opening formed therein corresponding with said at least one opening formed in said at least one membrane electrode assembly, and said at least one restraining member extending through said at least one opening formed in said membrane electrode assembly and through said at least one opening formed in said fluid flow field plates.

6. The electrochemical fuel cell stack of claim 1 wherein at least one of said first end plate and said second end plate has a cavity formed on the side facing away from membrane electrode assembly, said compressive means mounted within said cavity.

7. The electrochemical fuel cell stack of claim 1 wherein said compressive means comprises at least one disc spring.

8. The electrochemical fuel cell stack of claim 7 wherein said at least one disc spring comprises a plurality of stacked disc springs.

9. The electrochemical fuel cell stack of claim 1 wherein said compressive means comprises a coiled spring.

10. The electrochemical fuel cell stack of claim 1 wherein said at least one restraining member is threaded at each of its opposite ends and said fastening means comprise correspondingly threaded nuts.

11. The electrochemical fuel cell stack of claim 1 wherein each of said first and second end plates is square, said at least one membrane electrode assembly has at least four openings formed therein, and said at least one restraining member comprises four restraining members extending through said openings, each of said restraining members extending through said first and second end plates substantially at the center of the quadrants thereof.

12. The electrochemical fuel cell stack of claim 1 wherein said at least one restraining member is a single restraining member extending through said first and second end plates substantially at the center thereof.

13. An electrochemical fuel cell stack for producing electrical energy and reaction product from a fluid fuel stream and a fluid oxidant stream, said stack comprising:

(a) a fluid coolant stream;
(b) a first end plate;
(c) a second end plate;
(d) at least one fuel cell assembly interposed between said first and second end plates, said at least one fuel cell assembly comprising a membrane electrode assembly having a catalytically active region and further having at least one opening formed therein extending through said catalytically active region;
(e) a compression assembly comprising at least one restraining member extending within said at least one opening, fastening means disposed at opposite ends of said at least one restraining member, and compressive means interposed between at least one of said fastening means and at least one of said first and second end plates;

whereby said fastening means and said compressive means urge said first end plate toward said second end plate, thereby applying compressive force to said at least one fuel cell assembly.

14. The electrochemical fuel cell stack of claim 13 wherein said compressive means is integral with said restraining member.

15. The electrochemical fuel cell stack of claim 13 wherein said at least one opening directs at least of one of said fluid fuel, oxidant and coolant streams through said fuel cell assembly.

16. The electrochemical fuel cell stack of claim 13 wherein said at least one opening is substantially surrounded by said catalytically active region.

17. The electrochemical fuel cell stack of claim 13 wherein said at least one fuel cell assembly further comprises a pair of fluid flow field plates, said fluid flow field plates disposed on opposite sides of said membrane electrode assembly and having at least one opening formed therein corresponding with said at least one opening formed in said at least one membrane electrode assembly, said at least one restraining member extending through said at least one opening formed in said membrane electrode assembly and through said at least one opening formed in said fluid flow field plates.

18. The electrochemical fuel cell stack of claim 13 wherein at least one of said first end plate and said second end plate has a cavity formed on the side facing away from said membrane electrode assembly, said compressive means mounted within said cavity.

19. The electrochemical fuel cell stack of claim 13 wherein said compressive means comprises at least one disc spring.

20. The electrochemical fuel cell stack of claim 19 wherein said at least one disc spring comprises a plurality of stacked disc springs.

21. The electrochemical fuel cell stack of claim 13 wherein said compressive means comprises a coiled spring.

22. The electrochemical fuel cell stack of claim 13 wherein said at least one restraining member is threaded at each of its opposite ends and said fastening means comprise correspondingly threaded nuts.

23. The electrochemical fuel cell stack of claim 13 wherein each of said first and second end plates is square, said at least one membrane electrode assembly has at least four openings formed therein, and said at least one restraining member comprises four restraining members extending through said openings, each of said restraining members extending through said first and second end plates substantially at the center of the quadrants thereof.

24. The electrochemical fuel cell stack of claim 13 wherein said at least one restraining member is a single restraining member extending through said first and second end plates substantially at the center thereof.

25. An electrochemical fuel cell stack for producing electrical energy and reaction product from a fluid fuel stream and a fluid oxidant stream, said stack comprising a fuel stream inlet, an oxidant stream inlet, and at least one fuel cell assembly comprising a membrane electrode assembly having a catalytically active region, said at least one fuel cell assembly having openings formed therein extending through said catalytically active region, said openings comprising an inlet fuel stream header opening and an inlet oxidant stream header opening, wherein said inlet fuel stream header opening is in direct, unbranched fluid communication with said fuel stream inlet and said inlet oxidant stream header opening is in direct, unbranched fluid communication with said oxidant stream inlet.

26. The electrochemical fuel cell stack of claim 25 further comprising a fuel stream outlet and an oxidant stream outlet, wherein said openings further comprise an outlet fuel stream header opening and an outlet oxidant stream header opening.

27. The electrochemical fuel cell stack of claim 26 wherein said outlet fuel stream header opening is in direct, unbranched fluid communication with said fuel stream outlet and said outlet oxidant stream header opening is in direct, unbranched fluid communication with said oxidant stream outlet.

* * * * *

UNITED STATES PATENT AND TRADEMARK OFFICE
Certificate

Patent No. 5,484,666                                Patented: January 16, 1996

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Peter Gibb; Henry H. Voss; Wolfgang Schossler; Eric G. Pow; Donald A. Lines and Nicholas J. Fletcher.

Signed and Sealed this Eleventh Day of November, 1997.

PRICE WILLIS, JR.
S.P.E. Art Unit 1111
Patent Examining Groups 1100/2900
General, Metallurgical, Inorganic,
Petroleum, Electrical Chemistry, and
Engineering